F. H. Bartholomew,
Water-Closet Valve.
No. 1,072. Reissued Nov. 13, 1860.
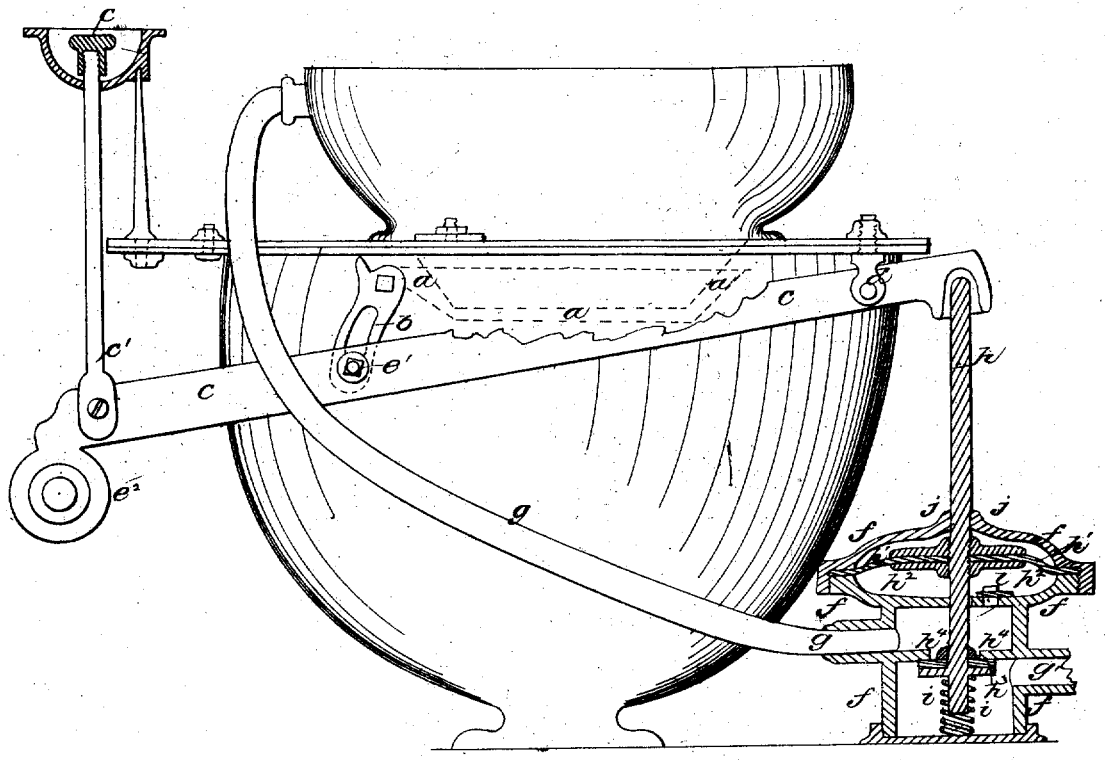
Witnesses:
David Morrison
Fred'k M. Bartholomew
Inventor.
F. H. Bartholomew

UNITED STATES PATENT OFFICE.

FREDERICK H. BARTHOLOMEW, OF NEW YORK, N. Y.

IMPROVEMENT IN METHOD OF GOVERNING THE ACTION OF VALVE-COCKS.

Specification forming part of Letters Patent No. 11,113, dated June 20, 1854; Reissue No. 1,072, dated November 13, 1860.

DIVISION B.

*To all whom it may concern:*

Be it known that I, FREDERICK H. BARTHOLOMEW, of the city of New York, have invented certain new and useful Improvements in Water-Closets, of the variety usually known as "Pan-Closets," and designed for the better regulating the supply of water to such closets at the same time that a sufficiency of supply is secured.

In the drawing is shown a vertical section through certain parts of the apparatus as a whole, with other parts represented in elevation; and in connection with such drawing the following specification is a full, clear, and exact description of my invention.

My improvements are applicable to that class of pan-closets in which no auxiliary cistern or reservoir of water is used, but where the water is supplied directly to the closet from a street-main or from some proper source of supply directly and without passing through a cistern in which the level of the water is governed by a ball-cock or some similar contrivance; and my invention does not consist in any new element taken by itself or separately, but in a new combination of old and known devices, so as to produce what I deem the best results; and the object of my invention is to afford a sufficient supply of water on either the falling or rising of the pan, or both, without the use of an auxiliary cistern, when a pull upon the ordinary pan lever-handle operates both upon the pan and upon the valve and a variable chamber governing the supply of water, and when that valve is forced to its seat by a spring or some proper equivalent thereof, such spring or its equivalent acting upon the valve, while an ordinary counterbalance closes the pan.

In the drawing the pan of the closet is represented in dotted lines at *a a a*, the slotted rock-shaft arm connected to the pan is represented at *b*, and the pan-lever and its handle are shown at *c c'*. This lever is pivoted at *d*, and a pin, *e*, projects from it into the slot of the rock-shaft. On the end of this lever is an ordinary pan-counterbalance, $e^2$. Beneath the short arm of the lever lies a chamber, *f f*, having connected with it two pipes, *g g'*, the latter connected to a street-main, and the former leading, as clearly shown, to the basin of the closet. Into this chamber descends a stem, *h*, upon which the pan-lever acts while the pan is being depressed, and to this stem is attached, substantially as shown in the drawing, a diaphragm, *h'*. The periphery of this diaphragm is clamped substantially as shown in the drawing, and the chamber is cup-shaped below it, so as to form a cavity, $h^2$ $h^2$, which I call a "variable chamber." The stem fits loosely into the bottom of this cup and has attached near its lower end a valve, $h^3$, which seats upward against a seat, $h^4$. This seat lies between the pipes *g g'*, and when the valve is forced to its seat by a spring—such as *i i*—acting upon it, the flow of water into the basin is cut off. When the valve is off its seat, water will pass into the basin.

When the apparatus is ready for operation, water will enter around the stem into the chamber $h^2$ $h^2$ while the valve is on its seat. When the lever-handle is lifted, the pan will be opened, and at the same time the valve will be forced from its seat; but it will be opened gradually and slowly, as it cannot descend faster than is permitted by the escape of fluid from the variable chamber $h^2$ $h^2$ around the stem *h*. This prolonged resistance thus forced upon the operator of the pan-lever insures an admission of a considerable supply of water. When the handle is released, the counterbalance will shut the pan quickly; but the valve will not be closed by this descent of the counterbalance, but, on the contrary, will shut slowly, being forced to its seat by the spring which was compressed by the lever when the pan was opened, and being controlled and caused to move slowly by the slow entrance of water around the stem *h* into the variable chamber.

If the upper part of the chamber, as at *j j*, be fitted tolerably closely to the valve-stem, then the space between the diaphragm and the top of the chamber will also act as a variable chamber; but its change of capacity will be resisted by the admission or expulsion of air instead of water. Either of these variable chambers may be used separately with either water or air, and the stem attached to the diaphragm may fit the cups tightly if small apertures admitting a proper supply of air or water are made in any convenient place through the walls of the variable chamber. If a flow of water of some duration, on the opening only of the valve, is desired, a small clack-valve, like *l*, opening inward into the variable chamber, may be fitted to the apparatus. When this valve is thus applied, water will enter the variable chamber speedily as the supply-valve is forced upward, and the valve will close rapidly. If a slight flow of water into the pan is required as the valve opens, and a flow of some duration is needed as the valve shuts, then a clack or other valve is to be applied so as to open outward from the variable chamber; but in making these modifications care is to be taken that the actions of the spring and counterbalance are not altered, but that the former shall act to close the valve independently of the latter, while the counterbalance is free to raise or close the pan without being retarded or delayed in its operation by the slow closing of the valve.

Any kind of valve may be used in place of that shown in the drawing, so long as it is governed by a variable chamber and is opened by a pan-lever and closed by a spring or its equivalent.

Other variable chambers may be used in place of that shown, so long as they are applied to the valve so as to govern its motions and are provided with proper apertures for the gradual entrance and expulsion of fluids, and are, in fact, chambers of varying capacity. For instance, a piston might be employed in place of the diaphragm, provided the sides of the variable chamber were so constructed that the piston moved in contact with them water-tight, or nearly so.

Other springs or their equivalents may be substituted for that shown in the drawing, provided they produce the same effect in closing the valve, and the arrangement of the various parts of the apparatus may be changed and modified, so long as so arranged as to act in combination as before described; and other changes still involving the principles of my invention might be enumerated.

I claim as of my own invention the following devices in combination, viz:

1. A pan provided with a proper rock-shaft arm or its equivalent.

2. A valve or cock to open and close a passage-way leading from a street-main or its equivalent to a basin of a pan-closet.

3. A variable chamber connected with the valve so as to control its motions in either or both directions by retarding either its opening or closing, or both.

4. A spring or its equivalent compressed when the valve is opened and expanding to close the valve when the pressure upon the spring is released.

5. A lever so connected to the pan and to the valve as to open both when force is applied to the lever.

6. A counterbalance or its equivalent acting to raise or shut the pan, but not operating to close the valve; intending to claim none of these parts separately, but in combination only and when all of them are constructed and operate in combination substantially as herein described.

In testimony whereof I have hereunto subscribed my name on this 29th day of December, A. D. 1859.

FREDERICK H. BARTHOLOMEW.

In presence of—
ALEX. WALDRON,
D. S. GALLAGHER.